United States Patent
Winchester

(10) Patent No.: US 11,059,627 B2
(45) Date of Patent: Jul. 13, 2021

(54) DISPOSABLE TOILET TOTE BAG

(71) Applicant: Richard M. Winchester, St. Louis, MO (US)

(72) Inventor: Richard M. Winchester, St. Louis, MO (US)

(73) Assignee: Winchester & Associates, LLC, Ballowin, MO (US)

( * ) Notice: Subject to any disclaimer, the term of this patent is extended or adjusted under 35 U.S.C. 154(b) by 0 days.

(21) Appl. No.: 16/602,978

(22) Filed: Jan. 8, 2020

(65) Prior Publication Data

US 2020/0223593 A1 Jul. 16, 2020

Related U.S. Application Data

(60) Provisional application No. 62/918,013, filed on Jan. 10, 2019.

(51) Int. Cl.
| | |
|---|---|
| *B65D 33/00* | (2006.01) |
| *B65D 33/10* | (2006.01) |
| *B65D 65/42* | (2006.01) |
| *B65D 81/28* | (2006.01) |
| *B65D 33/06* | (2006.01) |
| *B65D 30/00* | (2006.01) |
| *B65D 33/02* | (2006.01) |

(52) U.S. Cl.
CPC ............ *B65D 33/10* (2013.01); *B65D 29/00* (2013.01); *B65D 33/02* (2013.01); *B65D 33/065* (2013.01); *B65D 65/42* (2013.01); *B65D 81/28* (2013.01)

(58) Field of Classification Search
CPC ........ B65D 33/10; B65D 29/00; B65D 33/02; B65D 33/065; B65D 65/42; B65D 1/28

USPC .......................................................... 383/10
See application file for complete search history.

(56) References Cited

U.S. PATENT DOCUMENTS

| | | | | |
|---|---|---|---|---|
| 2,710,196 | A | * 6/1955 | Larson | ................... A01G 20/30 280/654 |
| 3,001,206 | A | 9/1961 | Strehlke | |
| 3,752,494 | A | * 8/1973 | Dunn | ........................ B62B 1/18 280/47.26 |
| 3,883,053 | A | * 5/1975 | Pritchard | .................. A45F 3/12 224/264 |
| 3,906,555 | A | 9/1975 | Scott et al. | |
| 4,199,826 | A | 4/1980 | Devereux | |
| 4,343,053 | A | 8/1982 | O'Connor | |
| 4,453,938 | A | * 6/1984 | Brendling | ............. A61F 5/4401 383/113 |
| 4,603,432 | A | * 7/1986 | Marino | .............. B65D 88/1618 383/2 |
| 5,040,249 | A | 8/1991 | Diaz | |
| 5,367,718 | A | 11/1994 | Ellis | |

(Continued)

*Primary Examiner* — Peter N Helvey
(74) *Attorney, Agent, or Firm* — Paul M. Denk

(57) ABSTRACT

A disposable toilet tote bag, fabricated of waterproof vinyl, plastic or fabric, fully assembled with secured side walls, back wall, front wall, and bottom wall, and designed to a shape that conveniently holds a used toilet for enduring removal. A liner is provided within the tote bag, to add to its reinforcement during usage. Any waste fluids that drain from the toilet, after it has been removed, and is being conveyed, or held within the bag, and will not soil any surrounding area. An adjustable shoulder strap fits over the user's shoulder, for conveyance of the bag, and hand lifts are provided to either side of the bag, to facilitate its conveyance by a single installer.

18 Claims, 2 Drawing Sheets

(56) References Cited

U.S. PATENT DOCUMENTS

| | | | |
|---|---|---|---|
| 5,547,051 A * | 8/1996 | Bartscht | A45C 13/002 150/105 |
| 5,669,084 A | 9/1997 | Sakimura | |
| 5,682,623 A | 11/1997 | Fenoglio | |
| 6,039,376 A * | 3/2000 | Lopreiato | B65G 7/12 294/152 |
| 6,086,022 A * | 7/2000 | Dalton | B65F 1/1415 248/101 |
| 6,508,389 B1 * | 1/2003 | Ripoyla | A45F 3/14 182/3 |
| 6,641,008 B2 * | 11/2003 | Falzone | A45F 3/14 224/157 |
| 6,783,826 B2 | 8/2004 | Sherrpd et al. | |
| 6,802,085 B2 | 10/2004 | Catanescu et al. | |
| 8,287,189 B1 * | 10/2012 | Ulloa-Parra | B65F 1/0006 383/72 |
| 9,408,508 B2 | 8/2016 | Brown | |
| 2005/0201643 A1 * | 9/2005 | Ulloa-Parra | B65F 1/0006 383/71 |
| 2005/0220374 A1 * | 10/2005 | Thomas | B65D 33/2591 383/105 |
| 2006/0117475 A1 | 6/2006 | Hsu | |
| 2007/0189643 A1 * | 8/2007 | Tresenfeld | B65F 7/00 383/105 |
| 2007/0245477 A1 | 10/2007 | Land | |
| 2008/0072248 A1 | 3/2008 | Sosalla et al. | |
| 2008/0212903 A1 * | 9/2008 | Germanow | B65F 1/0026 383/42 |
| 2009/0034886 A1 * | 2/2009 | Conforti | B65F 1/06 383/43 |
| 2012/0048897 A1 * | 3/2012 | Fowler | B62D 43/005 224/42.2 |
| 2013/0216158 A1 * | 8/2013 | Meldeau | A45C 3/04 383/24 |
| 2014/0284327 A1 * | 9/2014 | Worley | B65F 1/002 220/4.24 |

\* cited by examiner

DISPOSABLE TOILET TOTE BAG

FIELD OF INVENTION

This invention relates to a conveyance means, and more specifically to a disposable toilet tote bag that allows the installer to facilitate the carrying of a new toilet into a residence or building, but more specifically, provides the conveyance means for removing the toilet bowl and tank that is being replaced, by placing it directly into a waterproof bag, for conveyance of such equipment and its associated messy residue from the residence after the completion of a plumbing project.

BACKGROUND OF THE INVENTION

As is well known in the plumbing field, one of the messiest tasks that an installer can be exposed to is the removal of a toilet bowl and its tank, from a building or residence, during its replacement. As can be well understood, when the toilet bowl is lifted from the floor, and its wax seal ring is separated, a significant amount of drippage, and other associated deleterious matter is deposited upon the proximate floor, until such time as the entire unit, is replaced. As commented, in the past, the removal and transporting of an existing toilet has always created messy problems for the installer. Due to the fact that the toilet is used to collect, hold, and flush all of the human waste products, and toxic household cleaning agents, this particular device substantially reduces if not eliminates the scattering of such waste products about the house, during removal. It is a known fact that externally and internal toilets are covered with the visible and invisible bacteria, germs, toxins and human waste partials. With this current invention, all the installer need do is to put on their sanitary gloves, and to unbolt the toilet ready for transporting.

As is well known in the plumbing, remodeling, tiling, maintenance, handyman, maintenance, do it yourself and flooring trades, one of the most dangerous, hated and messiest tasks that an installer can be exposed to is the removal of a toilet bowl and its tank, from a single or multi-story building or residence, during its replacement. Thousands of workers per year are injured due to the heavy, unbalanced and awkward design of toilets. They sprain their backs, injure their spines, slip and fall, or fall downstairs during the lifting and carrying of toilets. Workers have no free hands to open doors or grasp for the safety of stair railings. As can be well understood, when the toilet base is lifted off the plumbing waste pipe collar that is attached to the floor, the toilet waterproof seal is separated from its replaceable wax ring. A worker must lift the toilet up to a comfortable waist height "worker carrying position," while lifting and jarring a significant amount of remaining water seeps out of the toilet internal water trap and drips onto the worker's clothing, customer's flooring and furnishings, along with disintegrating pieces of the wax ring still partially blinging to the bottom of the toilet containing biohazardous human waste, toxic cleaning chemicals along with other associated deleterious toxic matter. As commented, in the past, the removal and transporting of an existing toilet has long been associated with multiple problems for the installer. Biohazardous leakage on installer's clothing, the homes or commercial building furnishings and flooring, during its initial disassembling and carrying throughout the house, without the use of a free hand to open doors and maneuver stairs safely. Due to the fact that the toilet is used to collect, hold and flush human waste products and toxic household cleaning agents, this particular device substantially reduces, if not eliminates, the scattering of such waste products on the installer's clothing, about the home's flooring, furnishings work vehicle and tools during its storage, removal and transporting. While at the same time allowing workers to store, lift and carry heavy, slippery and awkward toilets safely throughout homes, commercial and industrial buildings, while for the first time being able to open doors and hold onto stair railings with your hands being free, due to the bag's guiding handles and lifting/carrying straps. The disposable toilet tote bag not only keeps its surrounds clean and safe while making any company look professional, but also allows workers to transport toilets using elevators. It is a known fact that such externally and internally toilets are covered with visible and invisible bacteria, germs, toxins and human waste partials. With this current invention, all the installer needs to do is put on sanitary gloves, and unbolt the toilet ready for removal, storage, transporting or perinate disposal. The water tank's lid, any trash, rags or gloves can be placed into the disposable bag and discarded along with the toilet marking for only one trip and requiring only one technician.

SUMMARY OF THE INVENTION

This invention contemplates a cloth or polymer style bag, that is waterproof, and can be used and has sufficient strength for holding a removed toilet bowl and its tank, as it is being replaced. The bag is reasonably low cost, and therefore, can just be disposed of, without necessitating any further cleanup. The bag is waterproof and designed to custom fit a fully assembled or disassembled toilet, including its bowl, and any associated tank. The device will fit any toilet including the round, elongated, sectional, or even the one-piece style of toilet.

This invention relates to a conveyance means, and more specifically to a disposable toilet tote bag that allows the installer to facilitate the safe lifting, temporary waterproof storing and carrying of a new or used toilet allowing for the first time one free hand to open doors and maneuver stairs safely while entering or exiting a single, multi-level residence or multi-level commercial or industrial building, but more specifically, provides the conveyance means for removing the toilet bowl, water tank and its tank lid without the need to disassemble the existing toilet that is being replaced, by placing the toilet directly into a reinforced, waterproof, custom designed and engineered fitted bag specifically for toilets, for conveyance of such equipment and its associated water leakage and messy was ring residue on the installer's clothing, home flooring and furnishings either for repair, temporary storage or permanent removal during the bathroom repair or remodeling.

In usage, on the floor close to the toilet is the flattened and spread out tote bag of this invention. The installer need only to lift the toilet just enough to clear the collapsed bag, and place the toilet in the center of it, with conveyance handles and shoulder strap facing away from the toilet sides and draped around the edge of the opened bag.

All the user need do is to pull the tote bag, laden with the used toilet, straight up and locate the bag around the toilet, for ready lifting. The tote bag incorporates a shoulder strap, which is formed adjustable, so it can be used by installers who may be tall, or even short. It can also incorporate integrated handles, just like a suitcase, that allows one to lift it up in that manner, for conveyance. The shoulder strap is designed for lifting onto the shoulder, so that both the bag and its cargo can be easily lifted, and carried, for transport of the toilet from the house or building, without leaving any residue waist behind. Furthermore, the tote bag of this invention, and its shoulder strap, is uniquely affixed at various locations to the tote bag, and in the preferred embodiment, even underneath of it, so as to assure stable and solid support when the bag laden with the heavy toilet and is lifted, and ready for conveyance. In addition, the shoulder strap may be fabricated so that it has a low-level shoulder strap, or a high-level shoulder strap, so that it can be lifted and carried by installers of various height, conveniently, when disposing of a soiled or replaced toilet. And as stated, the bag may be disposable, so as to simply allow for its throwing away, with the toilet, once used.

This invention is made of polypropylene with a safe working load rating of 275 lbs @ 5:1 safety factor with shoulder lifting straps and guiding handles rated with tear strengths at 1400 KG or 3000 lbs. and has a full 4 mill poly waterproof liner that can be used and has sufficient strength to allow workers to store, lift and carry heavy, biohazardous, slippery and awkward toilets safely through a home or commercial building safely for themselves and others around them without the need to remove the toilet trap water, old existing was ring or dissemble or break the toilet into multiple pieces, as it is dispensable and being replaced. The bag being lower in the front and taller in the rear was not only designed to snuggly encapsulate every un-ergonomic toilet design, but the positioning of the bag's lifting straps helps balance and carry the toilet's unorthodox shape and unbalanced weight distribution, due to all toilets being much taller and heavier in the rear. The bag is reasonably low cost and recyclable; therefore, it can just be disposed of, without necessitating any further clean up. The bag has a 4-mill waterproof liner and is designed to custom fit any fully assembled toilet, including the bowl, toilet seat, water tank and associated tank cover. The device is engineered to fit toilets of any width height or length being of one-piece, sectional pieces with round or elongated bowls. The installer simply removes the water supply line, unbolts the two-toilet mounting bolts, scraps the was ring residue off of the floor and the toilet is ready for transporting. This allows the installer to facilitate the safe, servicing, lifting and carrying of a new or used toilet, allowing any installer for the first time, to have one free hand to open doors and traverse stairs safely while entering or exiting a single or multi-level residence or building, but more specifically provides the conveyance means for removing the toilet bowl, water tank and water tank lid without the need for the toilet disassembling, which eliminates the leakage and scattering of toxic waste as described above. This disposable toilet tote bag device also saves installers time by only requiring one worker and not having to disassemble the toilet or make the two or three trips required to carry disassembled biohazardous toilet sections, multiple tools and trash. In usage, flatten The Disposable Toilet Tote Bag on the floor with its front pointed towards the front of the toilet. Fold the front half of the bag under the remaining bag. Lift the toilet up from the rear just enough to clear the two toilet floor bolts and slide it forward toward the bag while keeping its front on the floor. Pivot the toilet 180 degrees and set the rear of the toilet into the bag first. Tilt the toilet backwards while at the same time pulling the bag up and around the entire toilet. Place the water tank lid lengthwise besides the toilet opposite of your body and fasten the two guiding handles together with their Velcro stripping. While safely squatting at the knees, grab the guiding handles with one hand and with your free hand place both lifting straps over your head onto your opposite shoulder. Stand up using your leg strength to lift, all of the weight transfers to your shoulders and your guiding hand control your required left and right movements leaving your free hand to open doors and grab onto stair railings for the safety of you and others. We have greatly exceeded any existing toilet's gross weight per our tested bag and strap ratings as listed above and have designed the 300 Lbs rated shoulder lifting straps to be continuous in length making two complete loops from the shoulder, down along the side of the bag, under the bag, up the opposite side and then repeat again. This allows for two continuous straps from the shoulder to beneath the toilet in two predetermined locations to support while balancing all of the existing toilet base sizes on the market today. Also, when the bag is flattened on the floor it provides a waterproof work surface that contains a completely assembled toilet, laid the toilet on its side to allow for any toilet repair/service and the bag will retain any remaining trap water, wax ring debris, cleaning rags, other related mess and toxic contaminants.

It is, therefore, the principal object of this invention is to provide a disposable toilet tote bag, that can conveniently fit around a removed toilet, contoured to extend up the sides and embrace the entire toilet, including its bowl, and tank, thereby preventing the drippage or drainage of any waste liquid or partials from the conveyed utensil.

Another object of this invention is to provide a disposable tote bag, that can be readily thrown away, once used.

Yet another object of this invention is to provide a tote bag for a toilet, that includes a shoulder strap that is adjustable, so that the bag can be used for removal of a toilet by an installer who may be taller, or shorter, regardless of the circumstances. A pair of shoulder straps may be used.

Still another object of this invention is to provide a toilet tote bag that will not drip waste product all over the house, as the toilet is removed.

Yet another object of this invention is to provide a tote bag that is moisture and waterproof, so as to hold and trap any drainage from the toilet, once removed from its sealed location upon the floor of the bathroom.

Yet another object of this invention is to provide a toilet tote bag that has handles to facilitate its conveyance similar to luggage.

Still another object of this invention is to provide a disposable tote bag that has a base material applied therein, and which may be scented, so that it masks any foul odors emanating from the toilet once removed.

Yet another object of this invention is to provide a toilet tote bag which incorporates a base that may be also treated of moisture proof materials, so that it will not deteriorate, when subjected to drainage from the toilet during its removal.

These and other objects may occur to those skilled in the art upon review of the summary of the invention as provided herein, and upon undertaking a study of the description of its preferred embodiment, in view of the drawings.

BRIEF DESCRIPTIONS OF THE DRAWINGS

In referring to the drawings, the toilet tote bag of this invention is shown in FIG. 1, disclosing the toilet, for removal, being fully located within the bag of this invention. This is an isometric view of the said bag;

FIG. 2 provides an isometric view of the empty tote bag, fully assembled and ready for occupancy by a removed toilet, in preparation for conveyance;

DESCRIPTION OF THE PREFERRED EMBODIMENT

Figure 1:
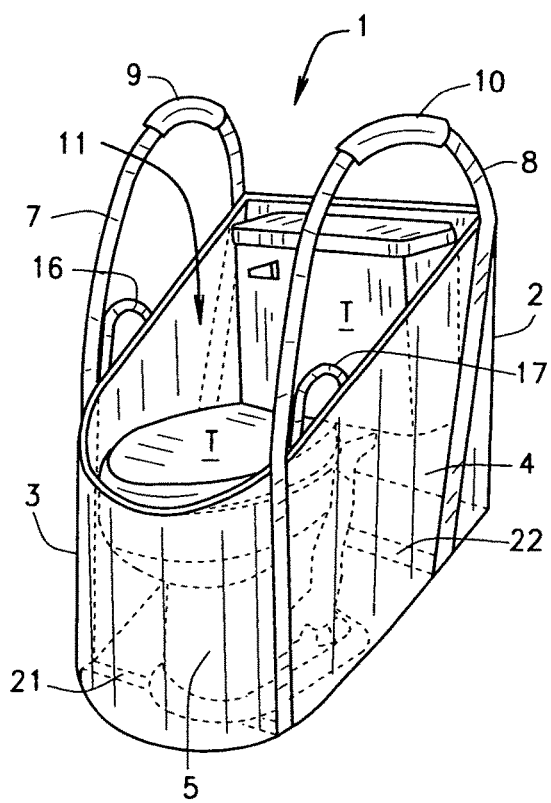

In referring to the drawings, and in particular FIG. 1, the tote bag 1 of this invention is readily disclosed. As can be seen, it has a combined substantially flattened surface along its back wall 2, and along the side walls 3 and 4, extending into an arcuate curvature, as at 5, around its frontal portion, as can be noted. Thus, with this type of formation, the bag can conveniently and compactly hold a toilet T, with its bowl and tank, including any tank lid, as can be noted.

Figure 2:
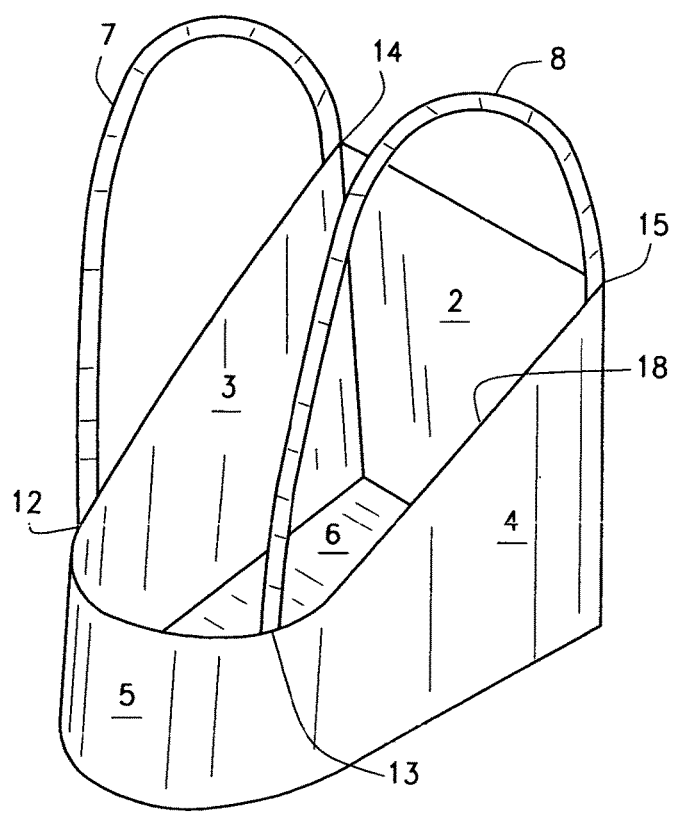

FIG. 2 generally shows the tote bag, without the toilet in place.

There is a bottom 6 that is applied to the tote bag, and the entire bag is fabricated of preferably a polymer, or fabric, and includes a pair of vinyl straps, as at 7 and 8, as can be seen. The bag itself may be formed of polypropylene, or other polymer that will make the bag waterproof, and prevent spillage of any of its contents as it is used for particularly carrying out the entire toilet, after it has been replaced through servicing. The straps 7 and 8 may be formed of vinyl, or other strapping material, and includes a wraparound portion, 9 and 10, on each strap, in order to function as cushioning, when the straps are placed upon the shoulder of the worker carrying the entire toilet, such as a new one, into a facility, or for carrying out the old one, after it has been replaced.

The toilet tote bag may include an inner liner, as at 11, and this liner is also waterproof, in order to prevent leakage of any soiled water from the bag, during its usage. Such liner may be of polyethylene, or other waterproof material, in order to provide for such attribute, as waterproofing of the tote bag, for its usage. Or, the fabric or polymer may be treated with a waterproof agent, such as silicone, in order to provide waterproofing attributes to the bag, so that when used, it will not leak. The bag can also be produced of a fabric, such as a denim, in its construction.

As can be noted, the shoulder straps 7 and 8 connect approximately at the front side, as at 12 and 13, and then loop around the bag towards its back corners, as at 14 and 15, so that when the toilet is located within the tote bag, the straps may be arranged around the shoulder of the installer, to add to the convenience of it being carried out of the building, from which it is used for removal of a replaced toilet. Obviously, a singular shoulder strap can be connected to the front and back of the bag, or can be connected at other locations, around the upper periphery of the bag, in order to add to the convenience of its usage, and carrying, during application.

Furthermore, there are a pair of hand straps 16 and 17 provided connecting approximate the front of the straps 7 and 8, to the upper edge of the bag 1, and these hand straps may be brought into proximity, in order to allow the user to not only combine the shoulder carrying of the entire bowl laden bag, but likewise to the hold the two hand straps together to facilitate conveyance of the tote bag. The hand straps may include any means for securing the two together, such as Velcro, so as to join and provide a singular hand grip for the user during application.

It may also be stated that the upper edge of the entire bag 1 may be folded over and hemmed, or any cowling provided thereto, as along the upper edge 18, in order to provide further reinforcement for the entire bag, around its upper periphery, to assure the longevity of its usage, and to prevent it from tearing, or any further destruction, during prolonged usage.

As was previously summarized, the bag has sufficient flexibility so that its sidewalls, back wall, and curved front, can be placed onto the surface of the floor, so that the toilet can be conveniently rested upon its interior base, such as 6, or bottom wall, and then pulled upwardly to encompass the toilet, in the manner as can be seen in said FIG. 1, all in preparation for its conveyance.

The configuration of the empty tote bag can also be seen in FIG. 2, with the toilet removed, that presents a more accurate description and viewing of the various walls 2 through 5, in addition to its bottom wall 6, as noted.

Figure 3:
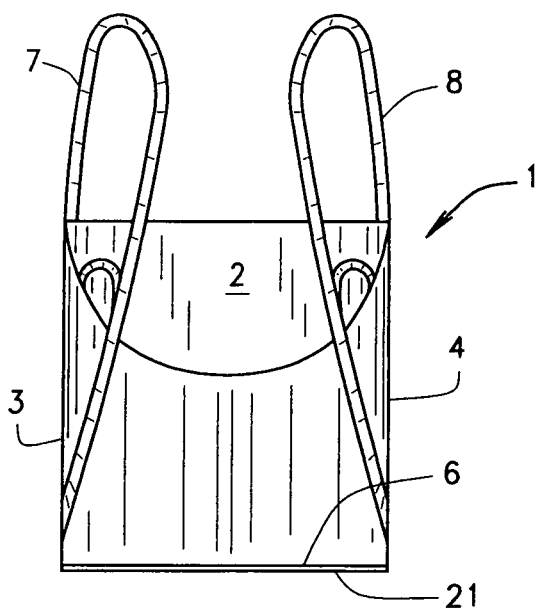
FIG. 3 is a front view of the tote bag of this invention.
Figure 4:
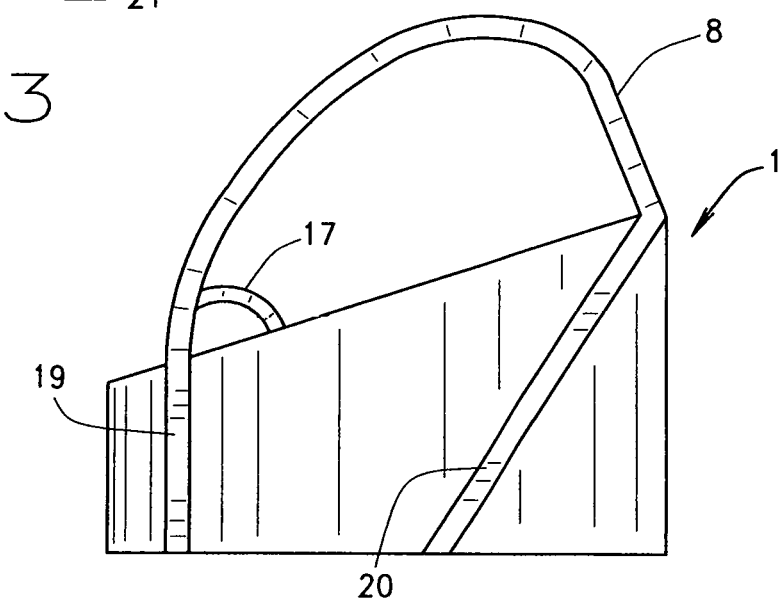
FIG. 4 is a side view of the tote bag of this invention, the opposite side view being a mirror image thereof.

Likewise, FIGS. 3 and 4 provide a front view and a side view for the structured bag 1, and it can be seen where the various walls and shoulder strap components are assembled into the structure of the device, when manufactured. Furthermore, as can be noted, the straps 7 and 8 extend down the side of the bag, as noted at 19 and 20, and even further extends underneath of the bottom wall 6, as can be seen at 21 and 22 in order to add to further reinforcement for the entire bag structure, to assure that it can lift the heavy toilet, both at its front proximity, and at its approximately back proximity, as can be noted in these figures. As previously stated, these straps 7 and 8, and their lowermost components 19 and 20, may be fabricated of a polymer, or any type of heavy strapping material, that can withstand repeated usage when conveying a heavily ladened bag, filled with a toilet and all of its components, including the tank, and lid, to different locations.

Figure 5:
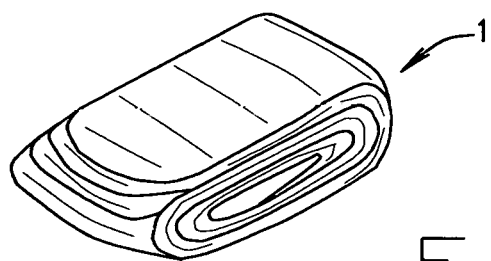
FIG. 5 shows the tote bag, and how it can be conveniently folded into a compact unit, before usage, and during storage.

As can also be noted in FIG. 5, the entire bag structure can be collapsed, folder over, in the manner as noted, so that it can easily be compactly stored, as when not in use. Furthermore, since the fabrication of this bag is done of relatively inexpensive components, it may be that the bag may be disposable, even after a single usage, and it has been soiled by the various waste materials and water that leaks from the removed toilet, following a plumbing operation.

Obviously, other modifications can be made to this bag, to facilitate its usage. For example, in addition to, or in lieu of the usage of the hand straps 16 and 17, there may be hand gripping areas, provided along or just below the upper edge 18, of the tote bag, so that hands may be applied at that location in order to lift the bag, in that manner, during its movement and usage.

Furthermore, and for reinforcement purposes, as stated, that straps may also extend around the bottom of the bag, as previously described, to add full reinforcement to the bag, through the extension of said straps. And, the upper ends of the straps may be looped into a pair of upper and lower loops, in order to provide for convenience in the carrying of the bag, as an alternative method of usage. Hence, the purpose of these variations is to allow the bag to be conveniently used by both a shorter installer, who can lift the bag by the hand loops, or apply the bag by means of its straps around the shoulder, when removing the shown toilet bowl, as noted in FIG. 1. Or, the worker can simply grasp the hand loops 16 and 17, to pick up the bag, which makes it more convenient for its conveyance during usage.

Obviously, the liner material for the bag, that may line its interior, will cover both the side wall, back wall, front wall, and also inside of the floor or bottom wall of the bag, with a liner having a corresponding shape to that of the interior of the bag, when constructed. Such a liner, in order to prevent soiling, or to become weakened by drippage of moisture, will be sealed all around its perimeter, and it may also be tree scented, in order to give off a masking aroma, during its usage. These are examples of how the tote bag can really add to the convenience of the efforts being employed by the installer, when dealing with such a project.

In usage, in order to provide for the safe use of such a toilet tote bag, one only need to simply follow the step-by-step instructions for its usage. The installer will remove the toilet from its previous installation. The toilet tote bag will be flattened onto the floor, about four feet away from the removed toilet, with its front pointed towards the toilet. Then, the installer folds the front half of the bag under the remaining bag. One then lifts the toilet up from the rear, just high enough to clear the floor bolts, and slides the toilet towards the bag, keeping the toilet front on the floor. Then, the installer pivots the toilet 180 degrees, setting the back into the bag, initially.

I claim:

1. A toilet tote bag for use for conveyance of a used toilet and its associated tank when removed from its installation, said bag incorporating side walls, a back wall, a front wall, and a bottom wall, all integrated together to provide a bag that conveniently embraces a shaped used toilet for removal, the upper edges of the back wall, side walls, and front wall being contoured to generally conform to the inclined shape of the toilet being removed, the back wall being the highest point of the bag, while the front wall being the lowest point of the bag, and there being a contoured upper edge for the bag between said back and front walls, and means provided for aiding in the conveyance of the toilet laden bag when removed, wherein the means provided for aiding in conveyance of the toilet laden bag when removed further comprises a pair of shoulder straps, and a pair of reinforced handles or hand holds provided upon the contoured upper edge for the said bag;

wherein said pair of shoulder straps connecting at their one ends to approximately the upper back wall of the bag, and securing at their front ends approximately at the front wall of said bag, such shoulder straps being spaced apart, and said straps provided to aid in the conveyance of the toilet tote bag during usage;

wherein said pair of handles or hand boles provided at the contoured upper edges of the toilet tote bag, one of each pair being provided in the region between the connection of the associated shoulder strap between the securement of its front end to the front wall of said bag, and the connection of its back end to the upper back wall of said bag, in order to allow the user to further obtain lift of the bag by means of said handles, while applying the shoulder straps about the shoulder of the user of said tote bag when conveying a used toilet and its tank.

2. The toilet tote bag of claim 1, wherein the said pair of handles or hand holds provided at the location where the shoulder straps secure at their front ends approximately at the front wall of said tote bag.

3. The toilet tote bag of claim 1 wherein said bag is disposable.

4. The toilet tote bag of claim 1 wherein said bag is made of a fabric or polymer, having sufficient waterproofing, to prevent leakage of any wastewater during conveyance of the used toilet.

5. The toilet tote bag of claim 1 and including a liner, said liner shaped to conveniently fit upon the bottom wall interiorly of the bag, to add to its reinforcement for support of the used toilet.

6. The toilet tote bag of claim 5 wherein said liner is treated for waterproofing, is treated with an insecticide to eliminate bacteria, and is scented to mask any foul odors emanating from the used toilet.

7. The toilet tote bag of claim 1 wherein said shoulder straps includes a pair of integral loops, one loop accommodating usage of the bag by a taller installer, while a shorter loop accommodates usage of the bag by a shorter installer.

8. The toilet tote bag of claim 1 wherein said shoulder strap includes an adjustable buckle to allow for adjustment of the strap in preparation for usage by an installer.

9. The toilet tote bag of claim 1 wherein said shoulder strap extends underneath said tote bag and secured therewith to add reinforcement during conveyance.

10. The toilet tote bag of claim 1 wherein said shoulder strap is adjustable.

11. The toilet tote bag of claim 1, and including a liner, said liner shaped to conveniently fit upon the bottom wall interiorly of the bag, and to interiorly fit around the back wall, side walls, and front wall of said bag, and therein furnish waterproofing to the toilet tote bag during its usage.

12. The toilet tote bag of claim 1, wherein the upper edges of the back wall, side walls, and front wall of said tote bag being reinforced through one of stitching, folded over, or having a cowling applied thereto to add to its reinforcement.

13. The toilet tote bag of claim 4, wherein the said polymer is one of polypropylene or polyethylene.

14. The toilet tote bag of claim 4, wherein the fabric is a denim.

15. The toilet tote bag of claim 11, wherein said liner is fabricated from polypropylene or polyethylene.

16. The toilet tote bag of claim 1, wherein each shoulder strap having a padded area to add to the comfort of the user during lifting and carrying of the toilet bowl ladened tote bag.

17. The toilet tote bag of claim 1 wherein said handles include fastening means to secure the handles together after locating of the used toilet therein.

18. The toilet tote bag of claim 17, wherein said fasteners holding the handles together comprises loop and pile connectors.

* * * * *